May 20, 1952     A. C. RUGE     2,597,751
BENDING BEAM LOAD WEIGHING DEVICE
Filed Feb. 26, 1948     2 SHEETS—SHEET 1
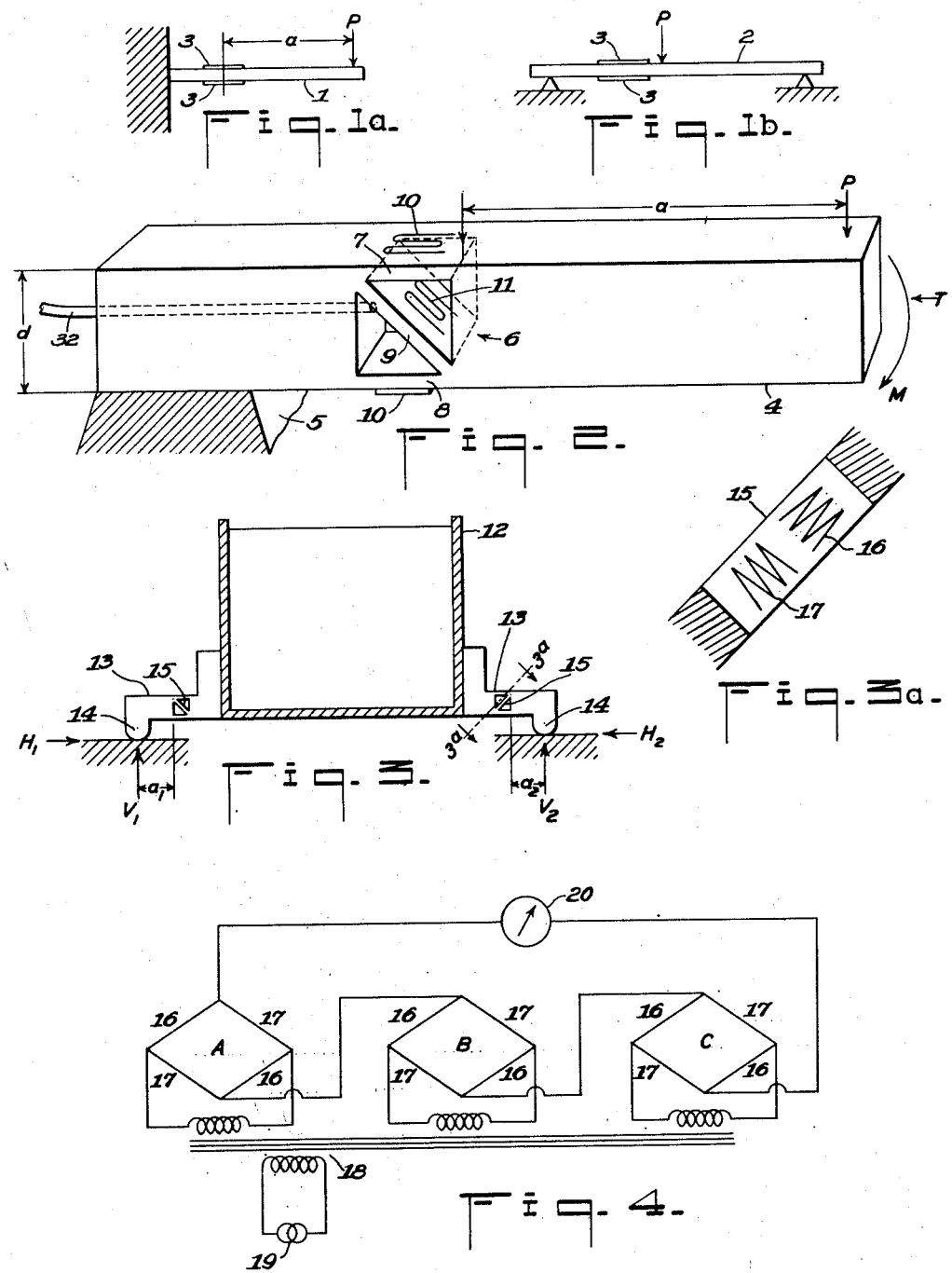
INVENTOR
ARTHUR C. RUGE
BY
ATTORNEY May 20, 1952      A. C. RUGE      2,597,751
BENDING BEAM LOAD WEIGHING DEVICE
Filed Feb. 26, 1948      2 SHEETS—SHEET 2
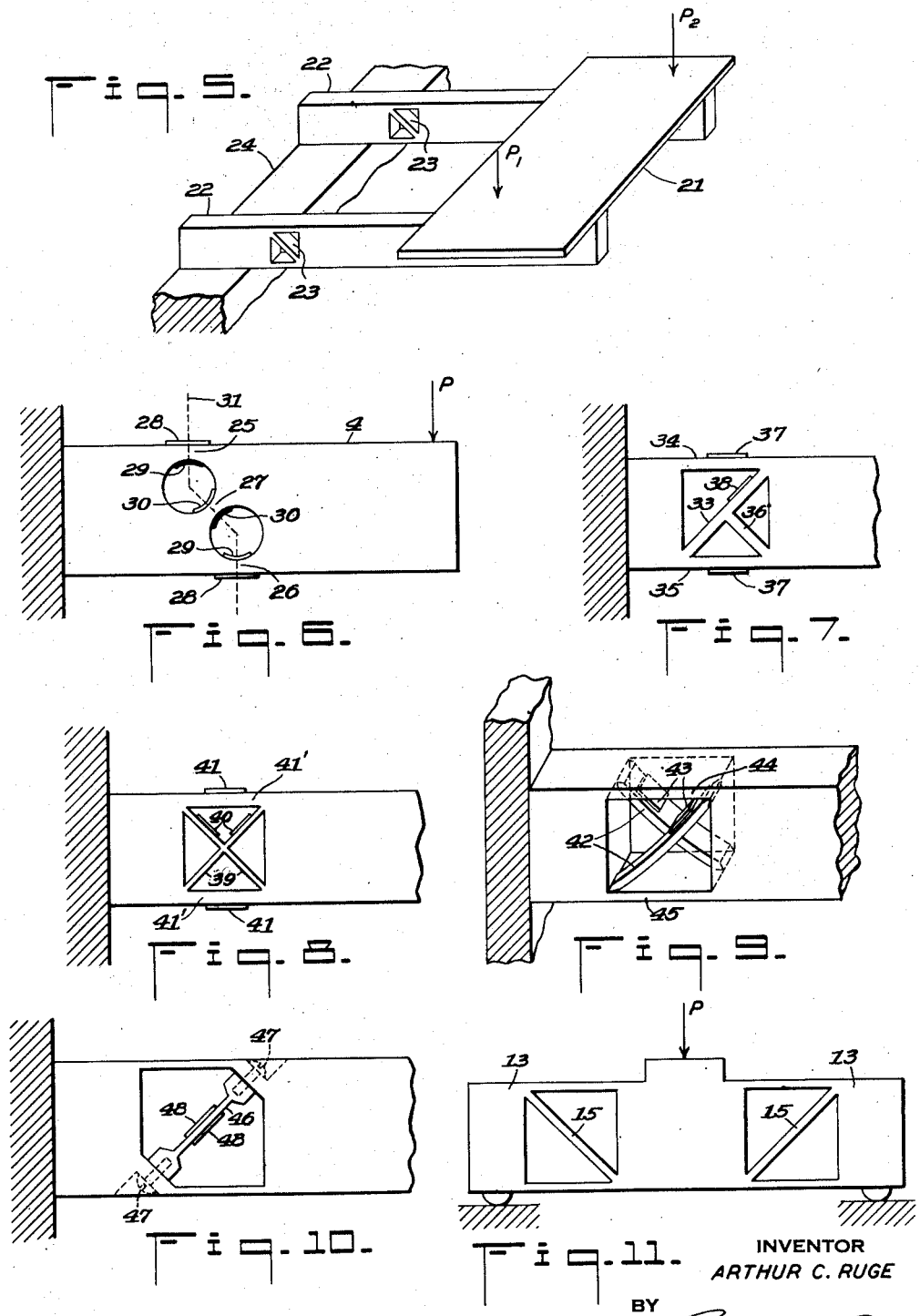
INVENTOR
ARTHUR C. RUGE
BY
ATTORNEY Patented May 20, 1952

2,597,751

UNITED STATES PATENT OFFICE 2,597,751

BENDING BEAM LOAD WEIGHING DEVICE

Arthur C. Ruge, Cambridge, Mass., assignor to Baldwin-Lima-Hamilton Corporation, a corporation of Pennsylvania Application February 26, 1948, Serial No. 11,121

12 Claims. (Cl. 201—63)

This invention relates generally to load weighing devices and more particularly to a bending beam type load weighing device in which the strain, induced in the beam by a load, is taken as a measure or index of the magnitude of the load, the strain being preferably measured by electrical impedance strain gages.

Conventional bending beam load weighing devices as heretofore used are deficient for certain conditions of use. One difficulty is that to have a given strain induced in the beam for a given load the deflection may be excessive. Another difficulty with the conventional type bending beam is that it must be calibrated by applying a load at a selected point on the beam and when the beam is subsequently put in service the load must be applied at that exact same point. Otherwise, the moment arm of the beam will be different from that used in the original calibration and the load will be of an unknown value which will be useless unless the beam is recalibrated. The objections and hazards incident to such situations are obvious for many applications.

One object of my invention is to provide an improved load responsive bending beam that will produce a high degree of strain for a given load with a relatively low degree of deflection.

Another object is to provide a beam-type load weighing device wherein the strain response to load is substantially independent of the position of the point of application of the load along the length of the beam.

Another object is to provide an improved scale employing the principles of my invention that may be effectively used either as a platform scale or as a component part of a conveyer scale.

Other objects and advantages will be more apparent to those skilled in the art from the following description of the accompanying drawings in which:

Figs. 1a and 1b diagrammatically illustrate conventional bending beams;

Fig. 2 is a perspective of my improved bending beam;

Fig. 3 is a vertical section showing my improved beam as applied to a weighing tank;

Fig. 3a is an enlarged view of the gage arrangement preferably employed in Fig. 3 and taken substantially on the line 3a—3a of Fig. 3;

Fig. 4 is a circuit diagram for determining the combined load on several bending beams such as might be employed in an application shown in Fig. 3;

Fig. 5 is a perspective of my invention applied to a scale of either the platform type or as a component of a conveyer scale;

Figs. 6, 7 and 8 are modified forms embodying the principles of my improved bending beam;

Figs. 9 and 10 are further modified forms of beams in which the diagonal shear resisting sensitive element is removably supported in the beam; and Fig. 11 is a load cell type of bending beam.

A form of load weighing device which has come into rather wide use in recent years is shown schematically in Figs. 1a and 1b, wherein an elastic member 1 or 2 is subjected to bending as a result of application of load P. Electrical impedance strain gage means 3 serve to measure the load P in terms of the resulting bending strain. Such devices are referred to herein as "conventional" bending beams in order to distinguish them from the improved device of my present invention.

The conventional bending beam is an effective load weighing device and is capable of giving a high degree of accuracy. It has the limitation, however, that the deflection under load becomes excessively large for certain applications requiring a high sensitivity combined with a high degree of rigidity. In other words high sensitivity is associated with low rigidity in most practical forms of the conventional bending beam device. My present invention employs a novel form of beam-type weighing device which has several unique properties as will presently appear.

Fig. 2 is an embodiment of the invention illustrating the basic principles. A relatively rigid beam 4, is supported at 5 so that it can safely and rigidly sustain any loads to be imposed on it. For the purpose of illustration, beam 4 may be assumed to be of solid rectangular cross section, although it could have a wide variety of shapes. At a region generally indicated at 6 the beam is "cut out" so that there remains top and bottom moment resisting members 7 and 8, and a diagonal shear resisting member 9. Now if a load P is applied outside of the region 6 such, for example, as at a distance a, it may be seen that the bending moment at such region is carried by members 7 and 8 acting in tension and compression respectively, while the shear at said region is carried by diagonal member 9 which is put into tension. This statement is not strictly true, due to the presence of the so-called "secondary" stresses in members 7, 8, and 9, but the degree of approximation is negligibly small for most practical cases. In fact, if members 7, 8, and 9 are hinged at their ends instead of built-in or fixed as shown, then the secondary stresses vanish. A convenient entry for an electrical strain gage conductor may be made as indicated at 32 by drilling a hole longitudinally from the end of the beam into the cut-out section.

Suppose it is desired to replace the conventional bending beam of Fig. 1a by the new device shown in Fig. 2. It may be seen that by placing electrical impedance strain-sensitive elements 10 (such as bonded wire strain gages) on members 7 or 8, or both, it becomes possible to measure the load P with a much smaller attendant deflection for the same sensitivity to load. This is because, by making members 7 and 8 of small area, the depth $d$ of the "beam" can be made greater than that of the conventional beam in Fig. 1a. Therefore, the deflection at load P will be smaller in the case of Fig. 2 than in the case of Fig. 1a for the same strain at gages 3 and 10 in Figs. 1a and 2, respectively. The reason members 7 and 8 can be made small in area is that the diagonal member 9 is provided to relieve them of carrying the shear. Thus in my construction the material is used more efficiently than in the case of a conventional bending beam.

If, as above stated, strain gages 10 in Fig. 2 are applied to members 7 or 8, or both, it is seen that the magnitude of load P may be measured exactly as would be the case in Fig. 1a; i. e., the indication of the strain gages will be directly proportional to the distance $a$ in both cases. In an earlier reference herein to "replacing" the conventional bending beam by my new device, I meant replacing it functionally in just this sense. Thus I have provided a "beam type" device which functionally replaces the device shown in Figure 1a, but I have actually done much more—I have made it possible to measure the load P with equal sensitivity while at the same time greatly reducing the deflection of the device in response to the load.

Having shown that the embodiment of Fig. 2 can functionally replace the simple conventional bending beam of Fig. 1a with improved results as regards deflection, I shall now show that it can perform still another function which is quite beyond the possibilities of the simple bending beam. If a strain gage 11 is applied to a diagonal member 9, the response of this strain gage may obviously be employed as a measure of load P. But, in contrast to the behavior of gages 10 on members 7 and 8, an entirely new result is obtained—the response of gage 11 to load P will be found to be substantially independent of the distance $a$ to the load P. This result might at first glance appear to be trivial, but actually it is of great value as may be seen from the embodiments and examples which follow. A corollary of this result is that a pure moment M (in the plane of the paper) applied to beam 4 will cause substantially no response in diagonal gage 11.

Further, when gage 11 is the load-sensing element it may be seen that members 7 and 8 can be made relatively heavy in section without appreciably influencing the shear load carried by member 9. The advantage here is that the deflection under a load such as P can be made very small since the deflection is then mainly determined by the strain in shear member 9. An additional advantage of making members 7 and 8 heavy is that the effect of a thrust load T upon member 9 can be made very small.

As a practical example of the board usefulness of the principle just described, I show in Fig. 3 a tank 12 supported on a number of load-sensitive legs 13 which weigh the load in terms of strain responsive gages 16 and 17 attached to shear-carrying members 15 as was explained in the discussion of Fig. 2. The legs terminate in ball feet 14 or other convenient bearing means. Now, since the response of gages 16 and 17 is governed substantially only by the vertical forces $V_1$ $V_2$, etc., it will be seen that the accuracy of measurement of the load contained in tank 12 is not influenced by the fact that the distances $a_1$, $a_2$, etc., to the point of application of the vertical forces will vary with the shape of the ball feet and irregularities of the floor. Also, the presence of horizontal forces $H_1$, $H_2$, etc., cause no appreciable errors since they do not produce shear forces in diagonal members 15. As indicated above, there may be two or more feet supporting the tank.

Means for averaging or totalizing the forces $V_1$, $V_2$, etc., so as to weigh the total of all the vertical forces are well known and are incidental to my present invention. However, for the sake of completeness of disclosure, I show in Fig. 4 one practical circuit out of many that are available for totalizing the vertical forces on three legs 13 such as might form the supports for tank 12 of Fig. 3. Each leg is equipped with two gages 16 and two gages 17 as shown in Fig. 3a and the four gages of each leg are connected into bridge circuits A, B, C, one bridge for each of the three legs, as shown in Fig. 4. Bridges A, B, and C are all fed from secondaries of a single transformer 18, the primary of which is supplied from a suitable A. C. source 19. The bridge outputs are connected in series and the total output is fed to a suitable indicating device 20 which may be a simple meter or an electronically-operated instrument such as is commonly used in modern industrial instrumentation.

Another practical embodiment of my invention is illustrated schematically in Fig. 5 which shows an overhanging type of platform scale. A load-carrying platform 21 is carried on rigid support 24 by two or more beam-like devices 22 which respond to the loads carried by their shear members 23 as was explained in connection with member 9 of Fig. 2. Due to the fact that the response is independent of the point of application of the load, it is evident from the above disclosure that loads such as $P_1$ and $P_2$ applied anywhere on platform 21 will be registered with full accuracy by strain gages applied to shear members 23. Thus it will be seen that I have provided a unique type of overhanging platform scale. The load carried by the several members 22 may be totalized by employing such a circuit as that shown in Fig. 4 for example. The embodiment of Fig. 5 can be of course incorporated as the weighing element of a conveyer scale.

While in Fig. 2 I show a very simple structure for the purpose of explaining the invention, there are many other forms it may take. Of these I illustrate only a few in Figs. 6 to 10, inclusive, it being understood that many others will occur to those skilled in the art once the basic principle is set forth. Fig. 6 shows a form which I have found especially suitable for the practical application of the present invention. Instead of the cut-out structure of Fig. 2, I here employ a section which is formed preferably by round holes which serve the same purpose. It may be observed that the structure in Fig. 6 comprises in effect two moment resisting members 25 and 26 and a diagonal member 27.

Strain responsive gages 28, 29, and 30 serve the same purpose as gages 10 and 11 in Fig. 2. Although this structure is not simple to analyze theoretically, I have found by actual test that it is as effective as the one shown in Fig. 2. It has the advantage of simple and economical construction since the holes are normally merely bored or drilled through the beam 4. When used as a functional replacement for a conventional bending beam it has another marked advantage; namely, that gages 29 placed inside the holes as shown are subject to a large stress concentration due to the presence of the holes and therefore provide a very high degree of sensitivity to applied load. When it is desired to measure the load without regard to its position, gages 30 are used, since they respond substantially only to the shear through the section which is cut by dotted line 31.

Two other useful arrangements of my cut-out section, which is adapted to carry bending moment and shear and to provide load responsive means which are sensitive to either or both, are shown in Figs. 7 and 8. Fig. 7 shows a K-type structure which is functionally identical to the simple diagonal structure shown in Fig. 2. In this case the shear-carrying diagonal 33 and its strain gage 38 act the same as diagonal 9 and its strain gage 11 in Fig. 2, while the moment resisting members 34, 35 and their gages 37 are also the same in their action as those in Fig. 2. The auxiliary diagonal 36 is the only difference, its function being to support member 33 laterally so that it may be made to carry large compressive forces without danger of buckling.

Fig. 8 shows a section having crossed diagonals 39 which may pass each other without being joined. Gages 40 act as the shear sensing elements. In this construction the total shear acting on the section is shared by the two diagonals in inverse proportion to their transverse cross sectional areas. It makes no difference whether gages 40 are applied to one or both diagonals but they would preferably be applied to both in which case one gage acts in tension while the other acts in compression; a condition which is desirable from the standpoint of sensitivity when the gages are placed in a bridge circuit. If the two diagonals 39 are equal in cross sectional area and if the two gages 40 are placed in adjacent arms of a bridge circuit, then it may be seen that the system will not respond at all to longitudinal thrust forces. This is because a thrust force would merely compress the two diagonals by equal amounts, which would not give rise to any unbalance of the bridge. The action of a shear load, however, is to subject the two diagonals to opposite stresses so that their effect is additive in unbalancing the bridge. If desired, gages 41, 41 may be mounted on moment resisting members 41.

An especially sensitive load-measuring arrangement is illustrated in Fig. 9 wherein the shear carrying members constitute a balanced pair of buckled members 42 on which are mounted strain gages 43. A complete discussion of the action of such buckled members will be found in my copending application Serial No. 10,112, filed February 21, 1948. The action of shear load is to increase the buckling of one member while decreasing that of the other. If gages 43 are connected in adjacent arms of a bridge circuit, the action is additive and substantially linear, as explained in said copending application. This arrangement makes it possible to measure very small loads accompanied by exceedingly small deflections. If moment resisting members 44 and 45 are made limber with respect to shear forces then it is easily seen that substantially all the shear will be carried by members 42 which are therefore very sensitive to the applied load. The presence of the two balanced members prevents the initial buckling forces from distorting the sensitive region since there is no resultant bending action on members 44 and 45.

The "cut-out" structures shown need not be cut out from a solid piece, but the structures may be fabricated from an assembly of pieces if desired. One such assembly is shown in Fig. 10 by way of example—many variations are possible within the scope of the invention. In Fig. 10 a diagonal member 46 is inserted in a cut-out section, being attached by screws 47 so that it can carry either tension or compression. The diagonal has a reduced flat section on which are mounted strain sensitive electrical impedance gages 48. This arrangement has the advantage of lending itself to economical strain gage application when the bonded wire type of gage is used. In addition, it makes it possible to provide a variety of measuring ranges by merely inserting diagonals, having the required cross sectional area, into the same basic structure.

Using the principle of the embodiment illustrated in Fig. 3, a novel form of load cell may be made by combining two or more load-weighing legs into a single structure, as illustrated schematically in Fig. 11 and provided with gages as shown in Fig. 3a. For simplicity, Fig. 11 shows only two such legs arranged to weigh a load P. The electrical totalizing would be performed by a circuit such as that shown in Fig. 4, or by other well known averaging or totalizing means. The advantages pointed out in connection with Fig. 3 are inherent here also.

From the disclosure herein it is seen that I have provided a relatively simple and effective load weighing bending beam that has a high degree of strain sensitivity combined with minimum deflection or that is adapted, if desired, to permit load to be applied to the bending beam within a wide range of points of application without the need of recalibrating the beam for each point of application. This latter feature is conducive to a high degree of accuracy, based upon an original calibration, regardless of how the device is installed under widely varying field conditions. The ability to obtain high strain sensitivity with minimum deflection is also very helpful in meeting certain specific application problems.

It will, of course, be understood by those skilled in the art that various changes may be made in the construction and arrangement of parts without departing from the spirit of the invention as set forth in the appended claims.

I claim:

1. A load weighing bending beam having a load sensing portion provided with moment resisting tension and compression members and a diagonal shear resisting member and the remaining portion of the beam being of greater rigidity in both bending and shear than said load sensing portion whereby the beam will have for a given load a high degree of load weighing sensitivity with a low degree of deflection, and electrical impedance strain responsive means mounted on at least one of said members whereby the response of said strain means is a function of the load to be weighed as applied to the beam.

2. The combination set forth in claim 1 further characterized in that the strain responsive means is mounted on one of said moment resisting members.

3. The combination set forth in claim 1 further characterized in that the strain responsive means is mounted on said shear member whereby a given strain sensitivity is obtained for the given load applied to the beam anywhere beyond the region of said members.

4. The combination set forth in claim 1 further characterized in that the beam is provided with a transverse opening having the shear member located diagonally therein.

5. The combination set forth in claim 1 further characterized in that the beam is provided with a transverse opening having the shear member located diagonally therein as a buckled column on which the strain responsive means is mounted.

6. The combination set forth in claim 1 further characterized in that the beam is provided with a transverse opening having the shear member located diagonally therein as a removable element.

7. The combination set forth in claim 1 further characterized by the provision of means whereby at least one of the members is removable.

8. A load weighing beam having moment resisting tension and compression members and a plurality of diagonal shear resisting members, and electrical impedance strain responsive means mounted on at least one of said shear resisting members whereby the response of said strain means is a function of the load to be weighed as applied to the beam, said plurality of shear members being disposed at an angle to each other.

9. A load weighing bending beam having a plurality of sets of moment resisting and diagonal shear resisting members, electrical impedance strain responsive means mounted on at least one of said members of each set whereby the response of said strain means is a function of the load to be weighed as applied to the beam, and said beam being supported at a plurality of points spaced along the beam and said sets of resisting members also being disposed in spaced relation to each other along the length of the beam.

10. A plurality of load weighing beams laterally disposed of each other, means for supporting a common load upon both of said beams, each beam having moment resisting tension and compression members and a diagonal shear resisting member, and electrical impedance strain responsive means mounted on at least one of said members whereby the response of said strain means is a function of the load applied to the beam.

11. The combination set forth in claim 1 further characterized in that said remaining portion of the beam has a cross section which is substantially continuous along its length.

12. The combination set forth in claim 1 further characterized in that the beam has circular transverse holes offset with respect to each other in a direction lengthwise of the beam so as to form said moment resisting and diagonal shear resisting members, and the strain responsive means being mounted on the inside surface of said holes at points of minimum thickness of the beam adjacent to the holes whereby a substantially maximum stress concentration is obtained.

ARTHUR C. RUGE.

REFERENCES CITED

The following references are of record in the file of this patent:

Brewer, The Electric Strain Gage, Metal Progress, July 1945, pages 91–96.